United States Patent
Takaya et al.

(10) Patent No.: US 8,529,843 B2
(45) Date of Patent: Sep. 10, 2013

(54) FIBROUS STRUCTURE AND PARTICULATE FILTER TYPE EXHAUST GAS PURIFYING CATALYST

(75) Inventors: Masahiro Takaya, Yokosuka (JP); Kouji Masuda, Tokyo (JP); Junji Ito, Yokohama (JP); Toshiharu Miyamura, Yokohama (JP); Yasunari Hanaki, Yokohama (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 646 days.

(21) Appl. No.: 12/521,050

(22) PCT Filed: Sep. 12, 2007

(86) PCT No.: PCT/JP2007/067740
§ 371 (c)(1),
(2), (4) Date: Jun. 24, 2009

(87) PCT Pub. No.: WO2008/111246
PCT Pub. Date: Sep. 18, 2008

(65) Prior Publication Data
US 2010/0028221 A1 Feb. 4, 2010

(30) Foreign Application Priority Data
Mar. 14, 2007 (JP) .................. 2007-064655

(51) Int. Cl.
*B01D 50/00* (2006.01)
(52) U.S. Cl.
USPC ..................................... 422/180

(58) Field of Classification Search
USPC ........................................... 422/180
See application file for complete search history.

(56) References Cited

U.S. PATENT DOCUMENTS

| 5,059,576 | A | * | 10/1991 | Kato et al. ................. 502/309 |
| 5,436,067 | A | | 7/1995 | Hanamoto et al. |
| 6,248,267 | B1 | * | 6/2001 | Hosako et al. .................. 264/11 |
| 2003/0056912 | A1 | | 3/2003 | Dellve et al. |
| 2004/0234428 | A1 | | 11/2004 | Tanahashi et al. |
| 2004/0258917 | A1 | * | 12/2004 | Matsui et al. ................. 428/395 |
| 2005/0235619 | A1 | * | 10/2005 | Heinz et al. ..................... 55/486 |
| 2007/0289275 | A1 | | 12/2007 | Ohno et al. |

FOREIGN PATENT DOCUMENTS

| EP | 1 710 014 A1 | 10/2006 |
| EP | 1 726 698 A1 | 11/2006 |
| JP | 6-294315 A | 10/1994 |
| JP | 7-143843 A | 6/1995 |
| JP | 8-189339 A | 7/1996 |
| JP | 2002-276339 A | 9/2002 |
| JP | 2002-276350 A | 9/2002 |

(Continued)

OTHER PUBLICATIONS

Japanese Office Action and English language translation dated Dec. 12, 2012 (7 pages).

*Primary Examiner* — Tom P. Duong
(74) *Attorney, Agent, or Firm* — Foley & Lardner LLP (57) ABSTRACT

A fibrous structure (10) of the present invention includes: long fibers (1) composed of an inorganic material; and short fibers (2) composed of the inorganic material and shorter than the long fibers (1), wherein at least one of the long fibers (1) and the short fibers (2) includes catalyst components (4), and a three-dimensional net-like structure is formed by the long fibers (1) and the short fibers (2).

14 Claims, 6 Drawing Sheets

(56) References Cited

FOREIGN PATENT DOCUMENTS

| | | |
|---|---|---|
| JP | 2002-295226 A | 10/2002 |
| JP | 2002-309923 A | 10/2002 |
| JP | 2003-236391 A | 8/2003 |
| JP | 2007-244950 A | 9/2007 |
| JP | 2007-244951 A | 9/2007 |
| JP | 2007275874 A * | 10/2007 |
| WO | WO 2006/092986 A1 | 9/2006 |

* cited by examiner

| TYPE | | CROSS SECTION | VERTICAL SECTION |
|---|---|---|---|
| TWO-LAYER TYPE | PARALLEL | | |
| | CORE-SHEATH | | |
| MULTI-LAYER TYPE | MULTIPLE PARALLEL | | |
| | MULTI-CORE | | |
| | RADIAL | | |

FIBROUS STRUCTURE AND PARTICULATE FILTER TYPE EXHAUST GAS PURIFYING CATALYST

TECHNICAL FIELD

The present invention relates to a fibrous structure and a particulate filter type exhaust gas purifying catalyst. Specifically, the present invention relates to a fibrous structure that can improve reduction performance of particulate matter (PM), and relates to a particulate filter type exhaust gas purifying catalyst using the fibrous structure.

BACKGROUND ART

Generally, a diesel particulate filter (DPF) is used for reducing particulate matter from a diesel engine. In conventional diesel particulate filters, PM is deposited on surfaces of cell walls, which causes a pressure loss of an exhaust gas to be increased rapidly, since the PM is trapped on the cell walls. Therefore, a system, in which an overheat combustion treatment at 600° C. or more by fuel injection is periodically operated in order to make DPF self-recovering, has been suggested (refer to Japanese Patent Unexamined Publication No. H06-294315 and Japanese Patent Unexamined Publication No. H08-189339).

DISCLOSURE OF INVENTION

However, in the system described in Japanese Patent Unexamined Publication No. H06-294315 and Japanese Patent Unexamined Publication No. H08-189339, there is a problem that it is necessary to detect the PM trapping amount, which makes the system complicated. In addition, there is a problem that fuel consumption becomes worse at the self-recovering because of injection of fuel.

The present invention has been made in consideration for such problems inherent in the conventional technology. It is an object of the present invention to provide a fibrous structure that prevents fuel consumption from becoming worse while improving PM reduction performance, and provide a particulate filter type exhaust gas purifying catalyst using the above-mentioned fibrous structure.

A fibrous structure according to a first embodiment of the present invention includes: long fibers composed of an inorganic material; and short fibers composed of the inorganic material and shorter than the long fibers, wherein at least one of the long fibers and the short fibers includes catalyst components, and a three-dimensional net-like structure is formed by the long fibers and the short fibers.

An exhaust gas purifying catalyst according to a second embodiment of the present invention includes: a honeycomb substrate including cell walls provided so that a plurality of cells parallel to each other are formed; and the fibrous structure provided in the cells.

A manufacturing method of a fibrous structure according to a third embodiment of the present invention includes: preparing long fibers composed of an inorganic material and short fibers composed of the inorganic material and shorter than the long fibers; mixing the long fibers and the short fibers with at least one of carbon and a blowing agent; and after the mixing, heating a mixture of the long fibers, the short fibers and at least one of the carbon and the blowing agent, followed by pyrolyzing the carbon and the blowing agent, wherein at least one of the long fibers and the short fibers includes catalyst components.

BEST MODE FOR CARRYING OUT THE INVENTION

Hereinafter, a description will be made of a fibrous structure and an exhaust gas purifying catalyst of the present invention. Note that, in this description and claims, "%" with regard to concentrations, contents and the like represents a mass percentage unless otherwise specified.

Figure 1:
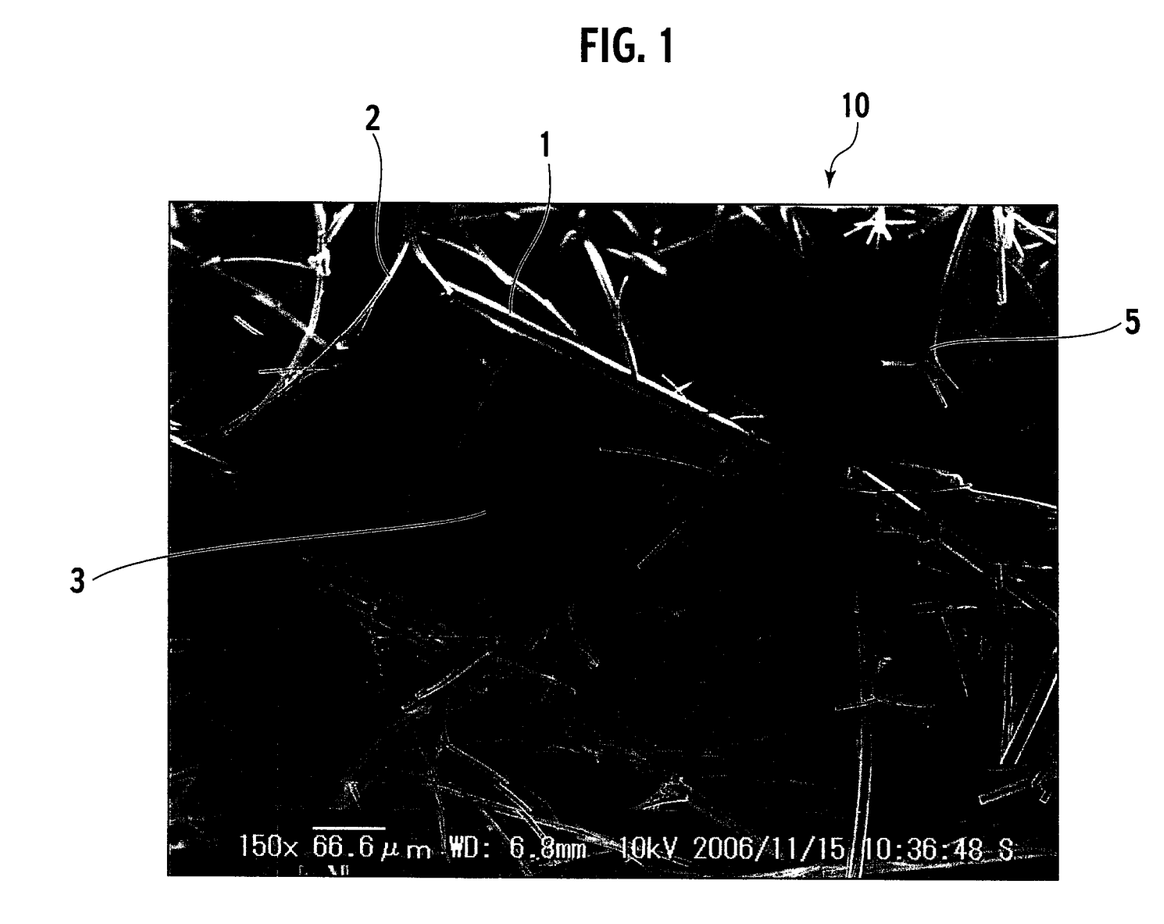
FIG. 1 is a scanning electron micrograph showing a fibrous structure according to an embodiment of the present invention.
Figure 2:
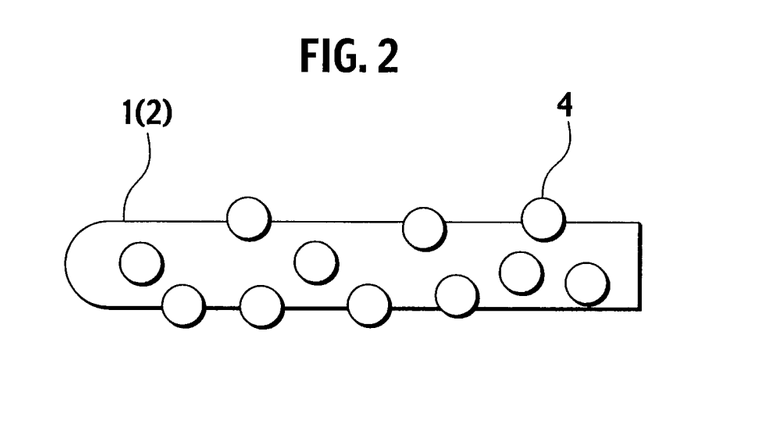
FIG. 2 is an enlarged view showing a long fiber or a short fiber composing the fibrous structure.

The fibrous structure of the present invention includes long fibers composed of an inorganic material, and short fibers composed of an inorganic material and shorter than the long fibers, in which at least one of the long fibers and the short fibers includes catalyst components, and the long fibers and the short fibers form a three-dimensional net-like structure. Specifically, as shown in FIG. 1, a fibrous structure 10 of the present invention has a net-like structure obtained by mixing multiple long fibers 1 and multiple short fibers 2. There are numerous voids 3 formed in the net-like structure, through which an exhaust gas including particulate matter (PM) passes. In addition, as shown in FIG. 2, catalyst components 4 are supported on a long fiber 1 and/or a short fiber 2 in the fibrous structure 10. Due to the net-like structure in the fibrous structure of the present invention as shown in FIG. 1, contact efficiency between the PM and the catalyst components is improved, and therefore, PM trapping efficiency is significantly increased. Note that, "the three-dimensional net-like" state in the present description represents a condition that the numerous voids 3 provided by being surrounded by the multiple long fibers 1 and the multiple short fibers 2 are present in the fibrous structure 10, and that the exhaust gas can pass through the voids 3.

In the fibrous structure of the present invention, a density of the fibrous structure is preferably 0.0005 to 0.5 g/cm$^3$, more preferably 0.005 to 0.05 g/cm$^3$, even more preferably 0.01 to 0.03 g/cm$^3$, and most preferably 0.01 to 0.02 g/cm$^3$. When the density of the fibrous structure is less than 0.0005 g/cm$^3$, the PM may not be trapped because the voids are too large. While, when the density of the fibrous structure is more than 0.5 g/cm$^3$, it may cause clogging since the voids are too small. A void content of the fibrous structure is preferably 60 vol % or more. It is easier to control pressure loss of the exhaust gas when the void content is 90 vol % or more. Moreover, both of the density and the void content of the fibrous structure are preferably within the above-mentioned ranges, respectively. Note that, the void content in the present description represents a volume percentage of the voids with respect to an apparent volume of a composite material such as the above-mentioned structure.

The long fibers and the short fibers are preferably included in the fibrous structure of the present invention with a ratio of 2:8 to 5:5 by mass, more preferably with a ratio of 3:7 to 4:6 by mass. When the ratio of the long fibers and the short fibers becomes more than 2:8, e.g. when the ratio of the long fibers and the short fibers becomes 1:9, a blockage between the fibers may be caused. While, when the ratio of the long fibers and the short fibers becomes less than 5:5, e.g. when the ratio of the long fibers and the short fibers becomes 6:4, the PM may not be trapped. Thus, it is possible to improve dispersibility of the catalyst components when the ratio of the long fibers and the short fibers is within the above-mentioned range (2:8 to 5:5).

Figure 3:
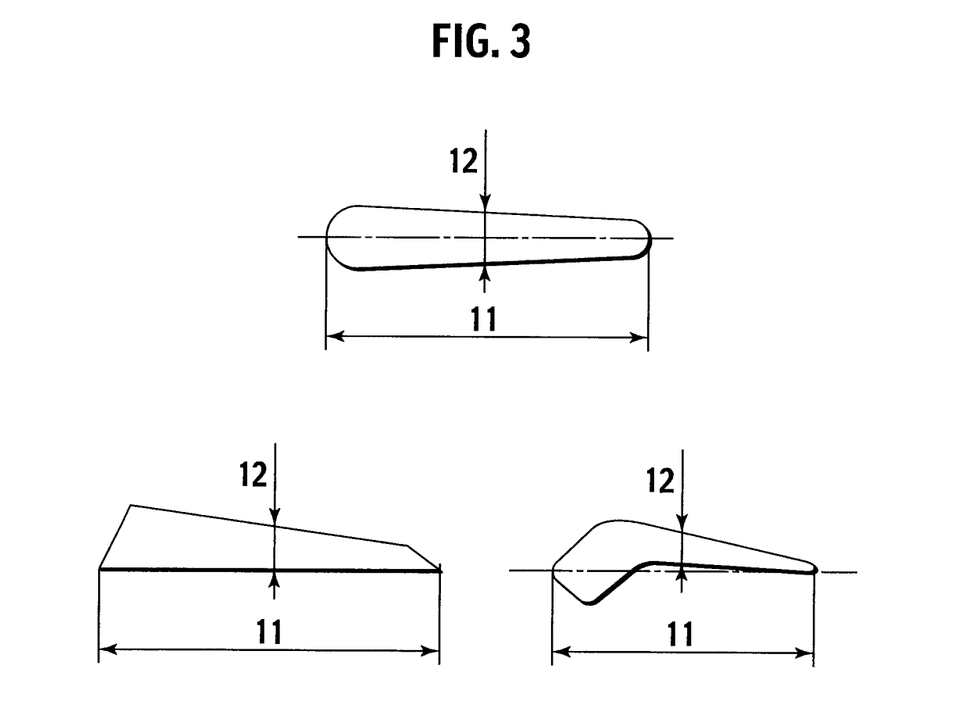
FIG. 3 is an explanatory view of a fiber length and a fiber diameter.

In the fibrous structure of the present invention, a fiber diameter of the long fibers and the short fibers is preferably 60 µm or less, more preferably 50 µm or less. When the fiber diameter of the long fibers and the short fibers is more than 60 µm, the sufficient void content and density necessary to trap the PM may not be obtained. The fiber diameter of the long fibers is preferably 5 to 35 µm, more preferably 7 to 15 µm. Also, the fiber diameter of the short fibers is preferably 1 to 10 µm, more preferably 3 to 5 µm. The long fibers with fiber diameters of less than 5 µm and more than 35 µm cannot be obtained by a winding forming after fiber forming. The short fibers with fiber diameters of less than 1 µm and more than 10 µm cannot be obtained by an injection moulding after fiber forming. A length of the long fibers is preferably 2 to 10 mm, more preferably 2 to 4 mm. A length of the short fibers is preferably 0.1 to 5 mm, more preferably 0.1 to 2 mm. Note that, as shown in FIG. 3, each fiber length 11 represents the largest distance between two points on an outer circumference of a projected profile shape of the fiber. Also, as shown in FIG. 3, each fiber diameter 12 represents a diameter perpendicular to the fiber length and passing through the middle point of the fiber length and the two points on the projected profile of the fiber.

In the fibrous structure including the long fibers and the short fibers with the above-mentioned fiber length and fiber diameter, the fibers are uniformly dispersed. In addition, in the fibrous structure supporting the catalyst components, the contact efficiency between the PM and the catalyst components can be improved, and also the desired void content can be achieved. When the fibrous structure is only composed of the short fibers, there is a possibility that the desired void content cannot be obtained, which may cause an increase in pressure loss.

Figure 4:
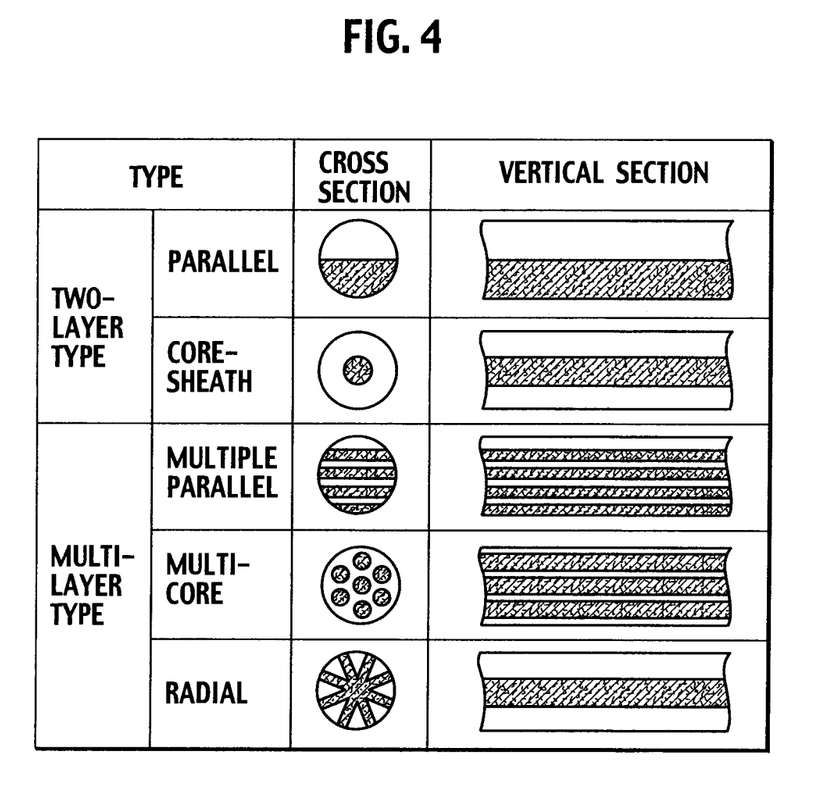
FIG. 4 is a view showing structures of conjugated fibers.

The fibrous structure of the present invention may be also obtained by including: the long fibers and the short fibers; the catalyst components supported on the long fibers and/or the short fibers; and conjugated fibers forming the three-dimensional structure. In the fibrous structure including the conjugated fibers in addition to the long fibers and the short fibers, the fibers are uniformly dispersed so as to improve the contact efficiency between the PM and the catalyst components, and achieve the desired void content. Due to the addition of the conjugated fibers, the structure is increased in intensity so as to maintain the void content even the flow rate of the exhaust gas is high. Note that, the conjugated fiber represents the fiber in which two or more kinds of inorganic materials with different characteristics are combined by a spinneret. Specifically, the conjugated fiber represents the fiber in which two or more kinds of inorganic materials with different components are combined by the spinneret and concurrently spun, and the multiple components are adherent to each other in a single fiber with a continued structure in each fiber length direction. As for the conjugated fiber used in the present invention, a conjugated fiber with a combination of an inorganic fiber not containing the catalyst components (e.g. inorganic fiber containing an alumina/silica component) and an inorganic fiber containing the catalyst components can be included. In such a conjugated fiber, preferably, the outer layer is the inorganic fiber containing the catalyst components and the inner layer is the inorganic fiber not containing the catalyst components. Thus, the contact efficiency between the catalyst components and the PM is improved. FIG. 4 shows specific structures of conjugated fibers.

In the fibrous structure of the present invention, the long fibers and the short fibers are composed of the inorganic fibers. The inorganic fiber is not limited, as long as it is tolerant enough to be used in the particulate filter type exhaust gas purifying catalyst. As for the inorganic fiber, silicon carbide, alumina, silica or alumina-silica fiber, and arbitrary combinations thereof can be included. As for the arbitrary combination of the inorganic fibers, a mixture and a composite compound of the inorganic compounds can be included. In addition, a so-called glass fiber containing alkaline metal and alkaline earth metal can be used as an inorganic fiber.

Preferably, the inorganic fiber of the present invention includes alumina and silica, and a content of alumina is preferably 70% or more. Due to the inclusion of alumina and silica, the inorganic fiber having high heat resistance properly and intensity can be obtained. In addition, such an inorganic fiber can highly keep the structure capable of improving the contact efficiency between the PM and the catalyst components, and can improve PM reduction performance. Moreover, when the content of alumina is 70% or more, supporting performance of the catalyst components is significantly improved. Therefore, the contact efficiency between the PM and the catalyst components can be improved so as to improve the PM reduction performance.

Preferably, the long fibers include aluminum and silicon, of which a ratio is 70:30 to 85:15 on a weight basis. Also, preferably, the short fibers include aluminum and silicon, of which a ratio is 80:20 to 99.9:0.1 on a weight basis. More preferably, both ratios of aluminum and silicon in the long fibers and the short fibers are within the above-mentioned ranges, respectively. When the ratio of aluminum and silicon in the long fibers is above 85:15, strength reduction may be caused. Thus, the long fibers may not be prepared since the long fibers are obtained by the winding forming after fiber forming. While, when the ratio of aluminum and silicon is below 70:30, heat resistance property is lowered. The short fibers in which the ratio of aluminum and silicon is above 99.9:0.1 may not be prepared efficiently since the short fibers are obtained by the injection moulding after fiber forming. Moreover, when the ratio of aluminum and silicon is below 80:20, heat resistance property is lowered.

In the fibrous structure of the present invention, the catalyst component is not limited, as long as it can promote the PM reduction performance. Preferably, the catalyst component includes noble metal such as platinum, palladium, and rhodium. Additionally, ceria and titania, for instance, may be included as a promoter. As for the catalyst component, an oxide in which a transition element is included, for instance, can be used. A content of the oxide is preferably 1 to 70% of the fibrous structure, more preferably 20 to 50%, even more preferably 30 to 45%. When the content is less than 1%, the PM reduction performance may not be sufficient. While, when the content is more than 70%, the fibrous structure may not be maintained. As for the transition element, cerium, yttrium, praseodymium, lanthanum, neodymium, manganese or zirconium can be used independently or in combination. In addition, a gallium oxide can be used as a catalyst component.

In the fibrous structure of the present invention, the short fibers may have a bifurcation structure. Specifically, short fibers 5 may have tips that are bifurcated as shown in FIG. 1. Such a structure can make PM adsorbing performance more improved. Moreover, due to having the bifurcated fibers, the voids between the fibers are easily provided. The bifurcation structure may be provided at the tips of the fibers, or may be provided at the middle of the fibers in a longitudinal direction.

Figure 5:
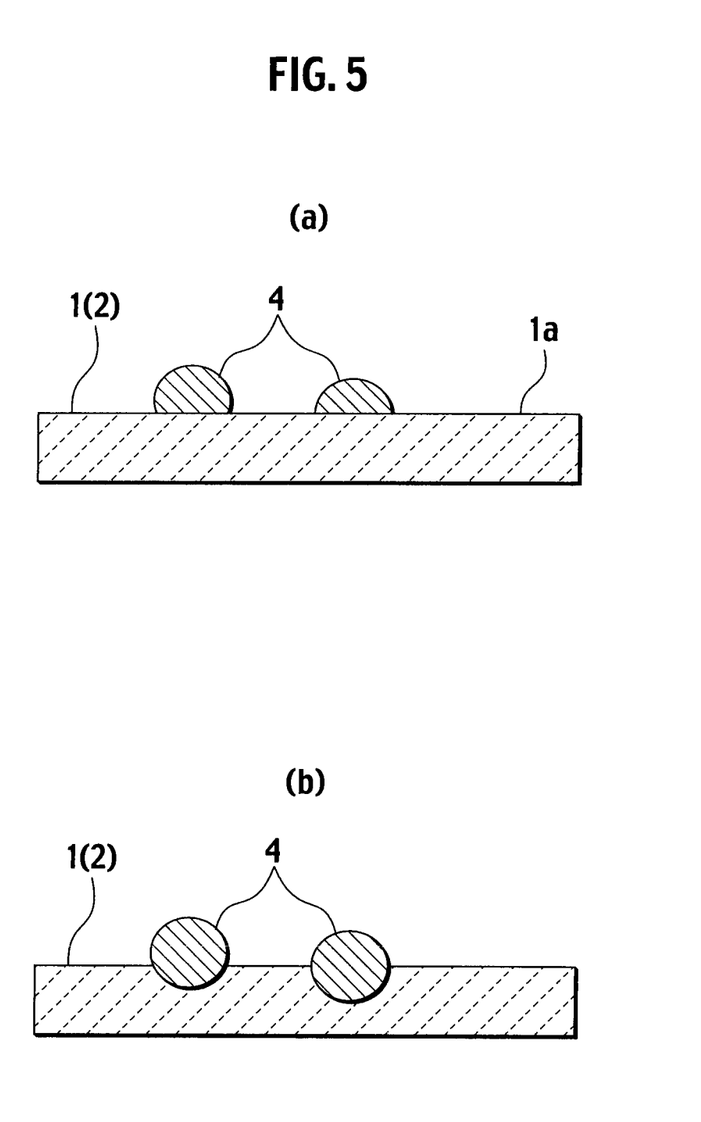
FIG. 5 is an enlarged cross-sectional view of a surface of the long fiber or the short fiber composing the fibrous structure, and (a) shows a fiber supporting catalyst components afterward, and (b) shows a fiber integrated with catalyst components.

Preferably, the catalyst components in the present invention are included in one of or both of the long fibers and the short fibers composing the fibrous structure, and some of the catalyst components are embedded in the fibers. Specifically, in the fiber of the present invention as shown in FIG. 5(a), PM purifying performance can be achieved even the catalyst components 4 are only supported on a surface 1a of the long fiber 1 and/or the short fiber 2. While, in the fiber of the present invention as shown in FIG. 5(b), preferably, the catalyst components 4 are embedded in the long fiber 1 and/or the short fiber 2, and the catalyst components 4 are partially covered with the fiber so as to tightly connect the catalyst components 4 to the inorganic fiber. Due to the structure in which the catalyst components are integrated with the inorganic fibers and the catalyst components are embedded in the fibers, the particulate filter type exhaust gas purifying catalyst adopting this structure can enhance the PM reduction performance. Moreover, it is possible to prevent the catalyst components from being detached when being subject to impact, and prevent catalytic activity from lowering because of a heat history. Further, design flexibility at preparing the catalyst can be improved.

When the fibers are integrated with the catalyst components, the intensity of the fibers is slightly lowered. However, durability of the catalytic activity (particulate oxidation property) is improved. Even when the short fibers integrated with the catalyst components are used as described above, the intensity of the fibrous structure of the present invention can be improved by adding the long fibers thereto. Therefore, the fibrous structure in which only the short fibers are integrated with the catalyst components and to which the long fibers are added has the highest intensity. The fibrous structure in which only the long fibers are integrated with the catalyst components has the second highest intensity. The fibrous structure in which both of the long fibers and the short fibers are integrated with the catalyst components has the lowest intensity compared to the other cases; however, have the highest durability of the catalytic activity. That means it is possible to reduce unnecessary catalyst components (especially high-priced noble metal) since the catalyst components integrated with the long fibers and the short fibers are not easily detached from the fibers. Whether the catalyst components are integrated with the long fibers and the short fibers depends on the priority of the catalytic performance durability and fibrous structure intensity.

As a manufacturing method of the long fibers and the short fibers integrated with the catalyst components as shown in FIG. 5(b), the following method can be adopted. First, an inorganic material composing the inorganic fibers, a metal compound composing the catalyst components, and a dispersing agent are mixed with a solvent. Next, the mixed liquid is vacuum-concentrated so as to obtain appropriate viscosity. Then, the concentrated liquid is filtered, sent and dry-spun, followed by baking to crystallize.

With regard to the inorganic material, aluminum basic chloride, basic acetate and basic nitrate can be illustrated as an aluminum compound. As a silicon compound, colloidal silica, water-soluble silicone, water-soluble siloxane derivative and silicon alkoxide can be illustrated. With regard to the metal compound, a compound that does not influence the fiber formation such as the above-mentioned metal nitrate, acetate, chloride, amine compound, carbonyl compound, and metal alkoxide can be illustrated. With regard to the dispersing agent, polyvinyl alcohol, starch, polyethylene oxide and polyethylene glycol can be illustrated. The inorganic material, the metal compound and the dispersing agent can be used independently or in combination with two or more of those accordingly.

While, in a manufacturing method of the bifurcated short fibers integrated with the catalyst components, the inorganic material, the metal component and the dispersing agent are mixed, injection-molded, followed by baking to crystallize.

As for the manufacturing method of the long fibers and the short fibers on which the catalyst components are supported as shown in FIG. 5(a), commercially available inorganic fibers are mixed into a solution in which the metal component is dissolved to support the metal component on the inorganic fibers, followed by drying and baking the mixture so as to obtain the long fibers and the short fibers.

In the fibrous structure supporting the catalyst component afterward as shown in FIG. 5(a), alumina is a-alumina regarding an alumina-silica fiber that is one example of the inorganic long fiber and short fiber. While, in the fibrous structure integrated with the catalyst components as shown in FIG. 5(b), alumina is γ-alumina regarding the alumina-silica fiber that is one example of the inorganic long fiber and short fiber.

In the fibrous structure of the present invention, the voids in the fibrous structure can be formed by use of one of or both of carbon and a blowing agent. Specifically, a slurry containing the long fibers, the short fibers, and one of or both of the carbon and the blowing agent is prepared, a substrate is coated with the obtained slurry, followed by drying and baking to pyrolyze the carbon and the blowing agent, thereby obtaining the fibrous structure having the voids. Due to such a manufacturing method, the desired void content can be achieved. In addition, regarding the fibrous structure in which the fibers are uniformly dispersed and the catalyst components are supported on the fibers, the contact efficiency between the PM and the catalyst components can be improved. As a blowing agent, a common organic blowing agent and an inorganic blowing agent as a chemical blowing agent can be used. As an organic blowing agent, ADCA (azodicarbonamide), DPN (N,N'-dinitrosopentamethylenetetramine) and OBSH (4,4'-oxybis(benzenesulfonylhydrazide)) can be included.

Next, a description will be made below in detail of a particulate filter type exhaust gas purifying catalyst of the present invention.

The particulate filter type exhaust gas purifying catalyst of the present invention includes: a structure having cells; and a fibrous structure formed by supporting catalyst components on a three-dimensional net-like structure including inorganic long fibers and short fibers. The fibrous structure is provided in the cells of the structure. Note that, regarding the catalyst provided with the structures, the configuration and components can be arranged appropriately as described above.

In a conventional diesel particulate filter (DPF), catalyst components such as platinum supported on the DPF in order to improve PM removal efficiency was embedded in cell walls. However, catalyst component performance could not be achieved sufficiently since the PM was deposited on the surface of the cell walls. Therefore, a proper structure possible to improve contact efficiency between the PM and the catalyst components was required in order to improve the PM removal efficiency.

In the particulate filter type exhaust gas purifying catalyst of the present invention, the contact efficiency between the PM included in the exhaust gas and the catalyst components are high. Therefore, the PM reduction performance can be improved since the fibrous structure having the net-like structure as shown in FIGS. 1 and 2 is adopted. As a result, continuous PM reduction between low temperature to high temperature can be achieved since it is possible to reduce the PM under a lower temperature condition compared to conventional catalysts. In addition, an overheat combustion treatment at 600° C. or more by fuel injection, which has been periodically operated in the conventional DPF in order to make DPF self-recovering, is not necessarily performed for the continuous PM reduction. Thus, it is possible to improve fuel consumption in the present catalyst. Moreover, it is possible to simplify and minimize a system at a system configuration. Furthermore, it is possible to arrange the catalyst components appropriately so as to maximize their abilities. Therefore, there is an advantage to reduce the amount of noble metal to be used as an example of the catalyst components. Note that, the catalyst components may be embedded in the inner walls of the cells.

In the exhaust gas purifying catalyst of the present invention, a figuration of the structure to be provided is not limited, as long as it includes a structure possible to pass the exhaust gas through and keep the fibrous structure in the cells of the structure. For instance, a structure including a plurality of cells such as a honeycomb substrate, and a structure such as a wall-flow type honeycomb substrate can be used. A materials of the structure is not limited, but may include ceramic such as cordierite and ferritic stainless. Especially, the structure made of porous ceramic may be preferably used.

In the exhaust gas purifying catalyst of the present invention, when the structure is one that includes a plurality of cells such as a honeycomb substrate, the fibrous structure may be provided in the cells of the structure in order to prevent pressure loss of the exhaust gas from remarkably increasing, and remove the PM. Due to such a configuration, the PM reduction performance can be improved. Note that the structure may be either wall-flow type or straight-flow type in this case.

Figure 6:
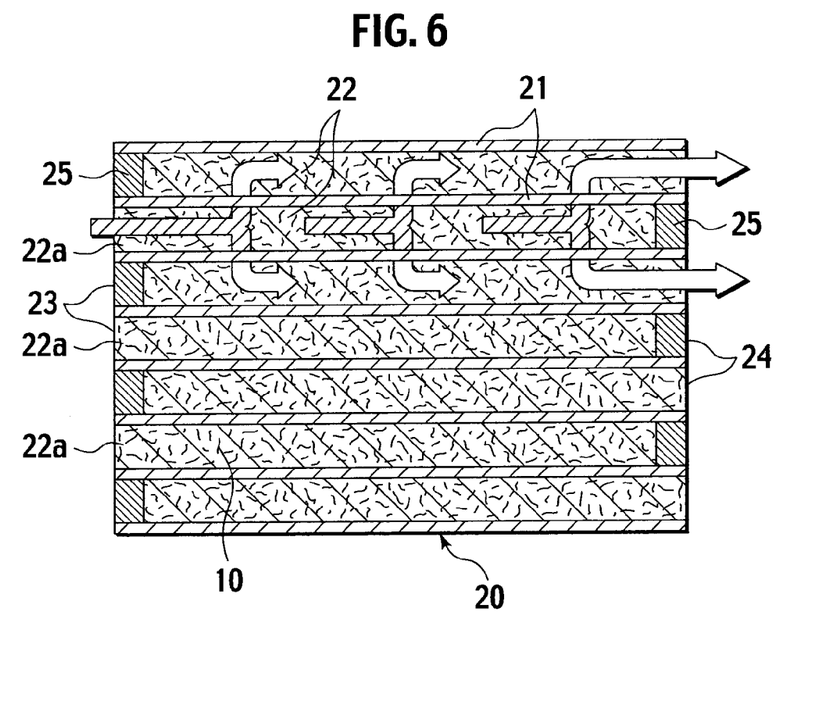
FIG. 6 is a schematic cross-sectional view showing a wall-flow type exhaust gas purifying catalyst according to an embodiment of the present invention.
Figure 7:
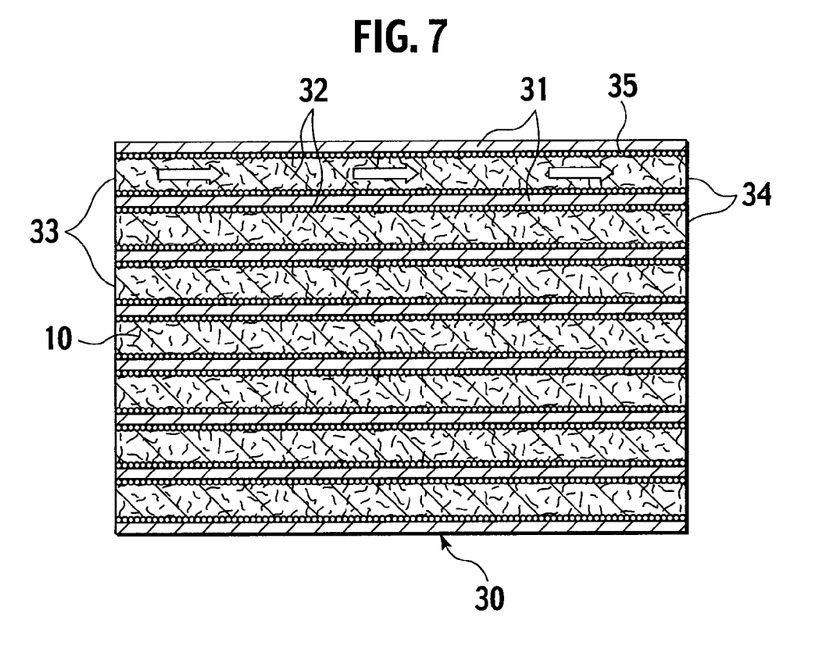
FIG. 7 is a schematic cross-sectional view showing a straight-flow type exhaust gas purifying catalyst according to an embodiment of the present invention.

FIGS. 6 and 7 show the embodiments of the exhaust gas purifying catalyst of the present invention. FIG. 6 shows the exhaust gas purifying catalyst using the wall-flow type structure, i.e. DPF. A DPF 20 includes cell walls 21 as a filter having a plurality of pores that have a diameter enough to remove the PM, and has a polygonal cross-section structure partitioned by the cell walls 21. In the DPF 20, multiple cells 22 are formed parallel to each other by the cell walls 21. In addition, cell inlets 23 and cell outlets 24 of the cells 22, which are adjacent to one another in the respective sides, are closed by sealing portions 25 alternately in a zigzag manner in each inlet side and outlet side. As shown by arrows in FIG. 6, the exhaust gas flows into the DPF 20 from the cells open at the cell inlets 23, passes through the plurality of pores of the cell walls 21, flows into the adjacent cells 22, and is discharged from the cell outlets 24 open at the ends of the cells 22.

In the present invention, the fibrous structure 10 is provided in the cells 22 as shown in FIG. 6. In such a way, the PM in the exhaust gas can be trapped not only by the cell walls 21 of the DPF but also by the fibrous structure 10. The trapped PM by the fibrous structure 10 is oxidized by contacting with the catalyst components, and discharged from the DPF 20. Moreover, due to the catalyst components of the fibrous structure 10, it is possible to oxidize or reduce not only the PM but also hydrocarbon (HC), carbon monoxide (CO) and nitrogen oxide (NOx) so as to decompose into harmless.

As described above, in the exhaust gas purifying catalyst of the present invention, the cell walls 21 of the DPF may be coated with the catalyst components such as noble metal and a promoter. Due to a synergistic effect of the catalyst components of the fibrous structure 10 and the catalyst components in the DPF 20, the PM, HC, CO and NOx can be removed effectively.

In addition, the exhaust gas purifying catalyst of the present invention can adopt the straight-flow type structure as shown in FIG. 7. In a straight-flow type honeycomb substrate 30, multiple cells 32 are formed parallel to each other by cell walls 31 similar to the DPF 20. However, there is a difference between the honeycomb substrate 30 and the DPF 20 in not having pores in the cell walls 31 through which the exhaust gas can pass. As shown by arrows in FIG. 7, the exhaust gas passes through the cells linearly from cell inlets 33 to cell outlets 34.

In the present invention, the fibrous structure 10 is provided in the cells 32 similar to the catalyst of FIG. 6. In such a way, the PM in the exhaust gas can be removed by the fibrous structure 10. Moreover, due to the catalyst components supported on the fibrous structure 10, it is possible to remove not only the PM but also hydrocarbon (HC), carbon monoxide (CO) and nitrogen oxide (NOx). In the present exhaust gas purifying catalyst, surfaces of the cell walls 31 may be also coated with the catalyst components such as noble metal and a promoter so as to form catalyst layers 35 similar to the catalyst of FIG. 6. Due to a synergistic effect of the catalyst components of the fibrous structure 10 and the catalyst components in the catalyst layers 35, the PM, HC, CO and NOx can be removed effectively.

In the case of the above-mentioned structure such as the wall-flow type honeycomb substrate, the fibrous structure 10 may be provided at least in the cells 22a having open ends provided upstream with respect to a gas-flow direction in the structure. Due to such a configuration, it is possible to improve the PM reduction performance and reduce the catalyst components.

Next, a description will be made below in further detail of effects of the particulate filter type exhaust gas purifying catalyst of the present invention.

Figure 8:
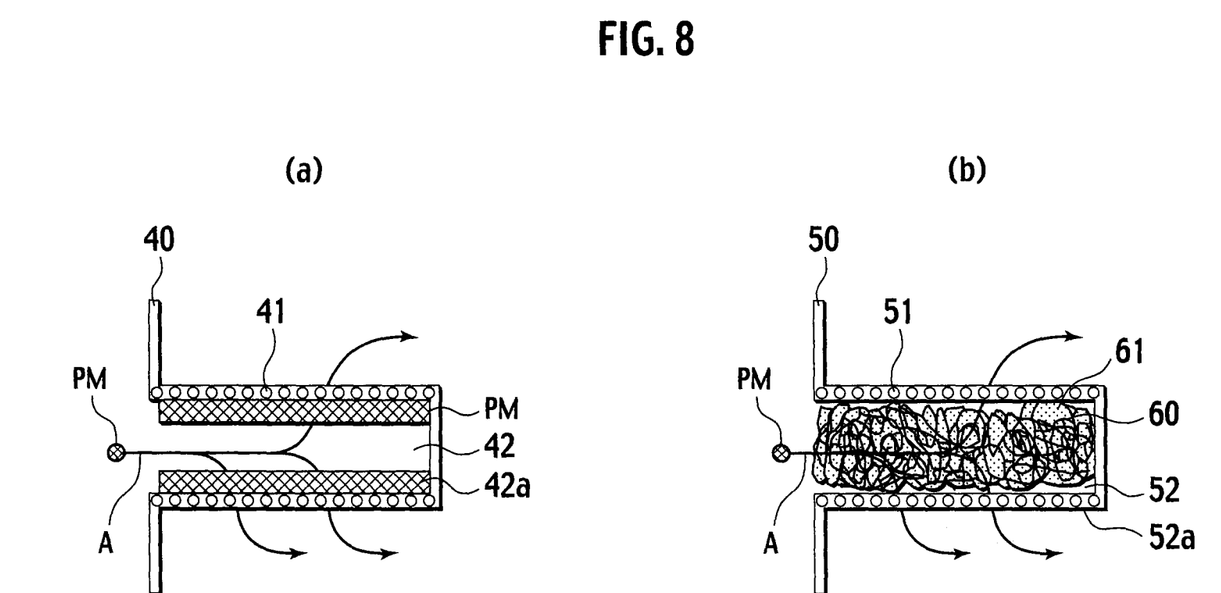
FIG. 8 is an enlarged cross-sectional view showing an embodiment of an exhaust gas purifying catalyst, and (a) shows a conventional exhaust gas purifying catalyst, and (b) shows an exhaust gas purifying catalyst according to an embodiment of the present invention.

FIG. 8(*a*) is an enlarged cross-sectional view of an embodiment of a conventional particulate filter type exhaust gas purifying catalyst. In the structure illustrated by the wall-flow type honeycomb substrate as shown in the figure, catalyst components 41 are supported on a cell wall 42a of a cell 42 that a structure 40 has therein. In this case, contact efficiency between the catalyst components 41 supported on the cell wall 42a and PM is not sufficient since the PM in the exhaust gas is deposited on a surface of the cell wall 42a in accordance with a flow of the exhaust gas indicated by allows A.

While, FIG. 8(*b*) is an enlarged cross-sectional view of an embodiment of a particulate filter type exhaust gas purifying catalyst of the present invention. In the structure illustrated by the wall-flow type honeycomb substrate as shown in the figure, catalyst components 51 are supported on a cell wall 52a of a cell 52 that a structure 50 has therein. Moreover, a fibrous structure 60 including inorganic long fibers and short fibers is provided in the cell 52 of the structure 50, and catalyst components 61 are supported on the fibrous structure 60. In this case, the contact efficiency between the catalyst components

51, 61 and PM is sufficient. Therefore, it is possible to reduce the PM before a large amount of PM in the exhaust gas has been deposited in accordance with a flow of the exhaust gas indicated by allows A. Note that, the PM size in FIG. 8 is exaggerated. The actual PM size is 1 μm or less.

The following is a description of an example of a manufacturing method of the particulate filter type exhaust gas purifying catalyst. The particulate filter type exhaust gas purifying catalyst of the present invention can employ a conventionally well-known DPF. A slurry containing a fibrous structure that includes inorganic long fibers and short fibers and supports catalyst components thereon is applied in cells of the DPF, followed by drying and baking to provide the fibrous structure in the cells. Thus, the particulate filter type exhaust gas purifying catalyst is obtained. According to this method, a process of supporting the catalyst components afterward is not necessary and the number of processes can be reduced. At the same time, there is an advantage of preventing from blocking fiber voids.

Alternatively, the particulate filter type exhaust gas purifying catalyst may be prepared by the following method. First, a slurry containing inorganic long fibers and short fibers is applied in the cells of the conventionally well-known DPF, followed by drying and baking. By providing the long fibers and the short fibers in the cells, a particulate filter type structure is formed. Then, a liquid or a slurry containing catalyst components is applied in cells of the obtained particulate filter type structure, followed by drying and baking. Thus, the catalyst components are supported on the long fibers and the short fibers in the cells, thereby obtaining the particulate filter type exhaust gas purifying catalyst.

Furthermore, the particulate filter type exhaust gas purifying catalyst may be prepared by the following method. First, a slurry containing a fibrous structure supporting catalyst components and also containing carbon is applied in the cells of the conventionally well-known DPF. Then, by drying and baking the DPF, carbon is burned out and the fibrous structure is provided in the cells, thereby obtaining the particulate filter type exhaust gas purifying catalyst. It is possible to obtain the desired voids in the structure by containing the carbon. As well as the carbon, it is possible to obtain the desired voids in the structure by containing the blowing agent.

In order to provide the fibrous structure 10 in all the cells 22 as shown in FIG. 6, the slurry containing the fibrous structure may be applied to the DPF 20 from both of the cell inlets 23 and the cell outlets 24 thereof, followed by drying and baking. Alternatively, the slurry may be applied to the DPF 20 from the cell inlets 23 first, followed by drying and baking. Then, the slurry may be applied from the cell outlets 24, followed by drying and baking, thereby providing the fibrous structure 10 in all the cells 22.

In the exhaust gas purifying catalyst of the present invention, the long fibers, the bifurcated short fibers, and the fibrous structure including the catalyst components may be provided in the cells of the structure. Due to such a configuration, the contact efficiency between the PM in the exhaust gas and the catalyst components becomes high. Thus, the PM reduction performance of the particulate filter type exhaust gas purifying catalyst is improved. Moreover, in the fibrous structure provided in the cells, it is possible to prevent the catalyst components from being detached when being subject to impact, and prevent catalytic activity from lowering because of a heat history. Further, design flexibility at preparing the catalyst can be improved. Therefore, also in the particulate filter type exhaust gas purifying catalyst including such a fibrous structure, it is possible to prevent the catalyst components from being detached and prevent catalyst activity from lowering. Thus, design flexibility at preparing the particulate filter type exhaust gas purifying catalyst can be improved.

With regard to a manufacturing method of the particulate filter type exhaust gas purifying catalyst including the bifurcated short fibers, the catalyst can be obtained by using the bifurcated short fibers as a substitute for the short fibers with no bifurcation in the above-mentioned manufacturing method.

In the case of including the conjugated fibers in the fibrous structure provided in the cells, it can be achieved by mixing the conjugated fibers with the slurry containing the long fibers and the short fibers, applying the slurry in the cells, followed by drying and baking.

With regard to a manufacturing method of the straight-flow type exhaust gas purifying catalyst shown in FIG. 7, the catalyst can be obtained by using the straight-flow type honeycomb substrate as a substitute for the DPF in the above-mentioned particulate filter type exhaust gas purifying catalyst.

In order to prepare the exhaust gas purifying catalyst shown in FIG. 8(*b*), the slurry containing the catalyst components is applied to the DPF. Then, the redundant slurry is removed, followed by drying and baking. Thus, the catalyst components 51 can be supported on the cell walls 52*a* of the cells 52 that the structure 50 has therein. Then, the fibrous structure is provided in the cells 52 by the above-mentioned method.

The exhaust gas purifying catalyst shown in FIG. 7 can be prepared by the similar method. First, the slurry containing the catalyst components is applied to the honeycomb substrate 30. Next, the redundant slurry is removed, followed by drying and baking. Thus, the catalyst layers 35 can be formed on the surfaces of the cell walls 31 of the honeycomb substrate 30. Then, the fibrous structure 10 is provided in the cells 32 by the above-mentioned method.

The present invention will be illustrated in further detail by the following Examples and Comparative Examples; however, the scope of the invention is not limited to these Examples.

EXAMPLE 1

First, long fibers (fiber length: 2 to 4 mm, fiber diameter: 3 to 10 μm) and short fibers (fiber length: 0.1 to 2 mm, fiber diameter: 3 to 10 μm) of alumina/silica fibers (Al/Si=80/20) were prepared. These fibers were mixed so that a mass ratio of the long fibers and the short fibers was 1:9, followed by putting in a vibration mill, whereby a mixture of the long fibers and the short fibers was obtained.

Next, 500 mL of a platinum (Pt) solution of a platinum concentration of 3% was impregnated with 50 g of the obtained mixture, followed by drying at 100° C. for 1 hour and baking at 400° C. for 1 hour, whereby 55 g of platinum-supported alumina/silica fibers were obtained. The Pt supported amount on the long fibers and the short fibers was 3%.

1160 g of the obtained platinum-supported alumina/silica fibers were provided in cells of a honeycomb substrate (volume: 1.0 L, cell count: 400 cpsi) by the above-mentioned method so as to have a three-dimensional net-like structure, whereby a particulate filter type exhaust gas purifying catalyst of this example was obtained.

EXAMPLE 2

Similar operations to those of Example 1 were performed except that long fibers and short fibers were mixed so that a mass ratio of the long fibers and the short fibers was 2:8, whereby a particulate filter type exhaust gas purifying catalyst of this example was obtained.

EXAMPLE 3

Similar operations to those of Example 1 were performed except that long fibers and short fibers were mixed so that a mass ratio of the long fibers and the short fibers was 5:5, whereby a particulate filter type exhaust gas purifying catalyst of this example was obtained.

EXAMPLE 4

Similar operations to those of Example 2 were performed except that fibers including Pt as a catalyst component were used, Pt was not supported afterward, and long fibers, short fibers and the catalyst components were integrated by the above-mentioned method, whereby a particulate filter type exhaust gas purifying catalyst of this example was obtained.

EXAMPLE 5

Similar operations to those of Example 3 were performed except that fibers including Pt as a catalyst component were used, Pt was not supported afterward, and long fibers, short fibers and the catalyst components were integrated by the above-mentioned method, whereby a particulate filter type exhaust gas purifying catalyst of this example was obtained.

COMPARATIVE EXAMPLE 1

Similar operations to those of Example 1 were performed except that only long fibers were used, whereby a particulate filter type exhaust gas purifying catalyst of this example was obtained.

COMPARATIVE EXAMPLE 2

Similar operations to those of Example 1 were performed except that only short fibers were used, whereby a particulate filter type exhaust gas purifying catalyst of this example was obtained.

[Performance Evaluation]

Each of the above-mentioned particulate filter type exhaust gas purifying catalysts of the examples was placed on an evaluation device, and a conversion rate of methane was measured under the following conditions. In addition, a density of the fibrous structure provided in the cells in each example was measured, and conditions were visually evaluated. The obtained results are shown in Table 1.

(Test Conditions)
Gas composition: methane; 4 vol %, oxygen; 10 vol %, rest; nitrogen
Gas flow rate: 200 cm$^3$/min
Catalyst temperature: 500° C.

With regard to the conditions in Table 1, "A" represents the condition that the three-dimensional net-like structure having the adequate voids in the cells formed by the long fibers and the short fibers is formed, and pressure loss is kept under a permissible limit so as to trap the PM in the exhaust gas effectively. "B" represents the condition that the void content is high and PM collection efficiency is lower than the condition "A". "C" represents the condition that pressure loss becomes high since the void content is low.

According to Table 1, it is recognized that Examples 1 to 5 within the scope of the present invention are superior to Comparative Examples 1 and 2 not included in the present invention with regard to the conversion rates of methane. This may be because the contact efficiency between the catalyst components and methane is improved. Thus, the PM reduction performance of such a particulate filter type exhaust gas purifying catalyst can be improved. In the particulate filter type exhaust gas purifying catalysts of Examples 1 to 3, 5 to 50% of the catalyst components are detached from the fibers since the catalyst components are supported after the fibers are formed. While, in the particulate filter type exhaust gas purifying catalysts of Examples 4 and 5, detachment of the catalyst components is not caused since the catalyst components are mixed at the fiber formation.

The entire contents of a Japanese Patent Application No. P2006-069122 with a filing date of Mar. 14, 2006, and a Japanese Patent Application No. P2007-064655 with a filing date of Mar. 14, 2007 are herein incorporated by reference.

Although the invention has been described above by reference to certain embodiments of the invention, the invention is not limited to the embodiments described above and modifications may become apparent to these skilled in the art, in light of the teachings herein.

INDUSTRIAL APPLICABILITY

According to the present invention, the fibrous structure provided by supporting the catalyst components on the three-dimensional net-like structure including the inorganic long fibers and short fibers is adopted so that the contact efficiency between the PM and the catalyst components can be improved. Therefore, in the exhaust gas purifying catalyst using the fibrous structure, it is possible to remove not only the PM but also hydrocarbon, carbon monoxide and nitrogen oxide efficiently.

The invention claimed is:
1. A fibrous structure, comprising:
long fibers composed of an inorganic material; and
bifurcated short fibers composed of the inorganic material and shorter than the long fibers,
wherein at least one of the long fibers and the bifurcated short fibers includes catalyst components, and a three-dimensional net-like structure is formed by the long fibers and the bifurcated short fibers, and
wherein particles of the catalyst components are embedded in the long fibers and/or the bifurcated short fibers themselves, and a part of each catalyst component particle is

TABLE 1

|  | Ex. 1 | Ex. 2 | Ex. 3 | Ex. 4 | Ex. 5 | Com. Ex. 1 | Com. Ex. 2 |
| --- | --- | --- | --- | --- | --- | --- | --- |
| Long fiber:Short fiber | 1:9 | 2:8 | 5:5 | 2:8 | 5:5 | 10:0 | 0:10 |
| Conversion Rate (%) | 30 | 55 | 70 | 55 | 70 | 17 | 3 |
| Density (g/cm$^3$) | 0.005 | 0.01 | 0.02 | 0.01 | 0.02 | 0.002 | 0.5 |
| Conditions | B | A | A | A | A | A | C | covered with the inorganic material composing the long fibers and/or the bifurcated short fibers.

2. The fibrous structure according to claim 1, wherein the catalyst components include noble metal.

3. The fibrous structure according to claim 1, further comprising: conjugated fibers.

4. The fibrous structure according to claim 1, wherein a density of the fibrous structure is between 0.0005 to 0.5 g/cm$^3$ or a void content of the fibrous structure is 60 vol % or more.

5. The fibrous structure according to claim 1, wherein the long fibers and the bifurcated short fibers are included so that a mass ratio of the long fibers and the bifurcated short fibers is between 2:8 to 5:5.

6. The fibrous structure according to claim 1, wherein a fiber diameter of the long fibers and the bifurcated short fibers is 60 μm or less.

7. The fibrous structure according to claim 1, wherein a fiber length of the long fibers is between 2 to 10 mm.

8. The fibrous structure according to claim 1, wherein a fiber diameter of the long fibers is between 5 to 35 μm.

9. The fibrous structure according to claim 1, wherein a fiber length of the bifurcated short fibers is between 0.1 to 5 mm.

10. The fibrous structure according to claim 1, wherein a fiber diameter of the bifurcated short fibers is between 1 to 10 μm.

11. An exhaust gas purifying catalyst, comprising:
a honeycomb substrate including cell walls provided so that a plurality of cells parallel to each other are formed; and
the fibrous structure according to claim 1 provided in the cells.

12. The exhaust gas purifying catalyst according to claim 11, wherein the honeycomb substrate is a diesel particulate filter provided with a plurality of pores in the cell walls through which exhaust gas passes.

13. The exhaust gas purifying catalyst according to claim 11, wherein surfaces of the cell walls are provided with catalyst layers.

14. A manufacturing method of the fibrous structure according to claim 1, the method comprising:
preparing long fibers composed of an inorganic material and short fibers composed of the inorganic material and shorter than the long fibers;
mixing the long fibers and the short fibers with at least one of carbon and a blowing agent; and
after the mixing, heating a mixture of the long fibers, the short fibers and at least one of the carbon and the blowing agent, followed by pyrolyzing at least one of the carbon and the blowing agent,
wherein at least one of the long fibers and the short fibers includes catalyst components.

* * * * *